Patented Jan. 13, 1942

2,269,472

UNITED STATES PATENT OFFICE 2,269,472

VULCANIZATION OF RUBBER

Arthur M. Neal, Wilmington, Del., and Bernard M. Sturgis, Pitman, N. J., assignors to E. I. du Pont de Nemours & Company, Wilmington, Del., a corporation of Delaware No Drawing. Application December 15, 1939, Serial No. 309,400

17 Claims. (Cl. 260—790)

This invention relates to the vulcanization of rubber and more particularly to accelerators of the vulcanization of rubber.

The general use of 2-mercapto-thiazoline as an accelerator of vulcanization has been disclosed in Patent 1,591,439 of July 6, 1926, to Sebrell. The use of secondary accelerators to activate the cure, obtainable with a primary accelerator, is also old in the art. It has generally been found, however, that it is impossible to use a secondary accelerator, such as an aldehyde-amine or a guanidine, with an acidic primary accelerator such as 2-mercaptobenzothiazole, because of the great activity of the combinations at processing temperatures. Secondary accelerators have been used successfully, however, with derivatives of 2-mercaptobenzothiazole, for example, the use of a guanidine with the benzyl ester of 2-mercaptobenzothiazole is disclosed in Patent 2,049,229 to Sibley.

It is an object of this invention to provide an improved method of vulcanizing rubber. Another object is to provide vulcanized rubber of improved properties. A further object is to improve the vulcanization of rubber by employing as accelerators therein a new combination of accelerators which are sufficiently safe at processing temperatures for commercial utilization and which are at the same time very active at normal vulcanization temperatures. A still further object is to provide a new combination of accelerators for the vulcanization of rubber, which produce vulcanized rubber of improved properties. Other objects are to provide new compositions of matter to advance the art. Still other objects will appear hereinafter.

The above and other objects may be accomplished in accordance with our invention, which comprises incorporating in a rubber stock, prior to vulcanization, a small proportion of a combination of primary and secondary accelerators, in which the primary accelerator is selected from the class of 2-mercapto-thiazoline and carbon substituted 2-mercapto-thiazolines, wherein the substituents are selected from alkyl and hydroxyalkyl groups bonded to the ring carbon atoms of the thiazoline ring, and the secondary accelerator is selected from aldehyde-amine and aryl-guanidine accelerators. We have found that such combinations of primary and secondary accelerators are sufficiently safe at ordinary processing temperatures to permit their use commercially, that is, such combination of accelerators does not tend to cause scorching or prevulcanization to an objectionable extent so as to make their use impractical commercially. At the same time, such combination of accelerators show maximum activity at the usual vulcanizing temperatures, and produce vulcanizates of high tensile strength and moduli.

We have found that the best results are obtained with 2-mercapto-thiazoline itself as a primary accelerator. Of the carbon substituted 2-mercapto-thiazolines, those, in which the substituents are alkyl groups, will generally be preferred and we particularly prefer those in which the alkyl groups are lower alkyl groups, that is, contain from one to six carbon atoms.

By the term "alkyl" we mean aliphatic radicals consisting of carbon and hydrogen. By the term "hydroxyalkyl" we mean aliphatic radicals, which, except for the hydroxy group, consist of carbon and hydrogen. By the term "a 2-mercapto-thiazoline" we mean a compound of the formula

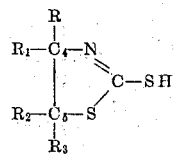

wherein R, R₁, R₂ and R₃ represent hydrogen or one or more of R, R₁, R₂ and R₃ represent an alkyl or hydroxyalkyl group. Also by the term "2-mercapto-thiazolines" we mean the class of 2-mercapto-thiazoline and the alkyl and hydroxyalkyl substituted compounds. By the term "carbon substituted 2-mercapto-thiazolines" we mean those in which the substituents are directly bonded to the ring carbon atoms of the thiazoline ring, that is, those in which the substituents are in the 4 or 5 or both the 4 and 5 positions.

While any of the aldehyde-amine and aryl guanidine accelerators may be employed we preferably employ the aldehyde-amine accelerators, and particularly butyraldehyde-aniline, known to the trade as "Accelerator 808." Of the aryl guanidine accelerators, we prefer di-ortho-tolyl guanidine and di-phenyl guanidine, The combination of accelerators, employed in accordance with our invention, will generally comprise from about 1 to 50 parts of the primary accelerator for each part of the secondary accelerator. When the secondary accelerator is an aryl guanidine, it will generally be preferred to employ from about 1.5 to about 10 parts of the primary accelerator for each part of the aryl guanidine. When an aldehyde-amine is employed as a secondary accelerator, it will generally be preferred to employ from about 2 to about 10 parts of the primary accelerator to each part of the aldehyde-amine.

In order to show the safety of these combinations at the processing temperatures with the desirable properties obtainable at vulcanizing temperatures, the following stocks were prepared. The base stock used in these tests is essentially the base stock of a modern inner tube.

|  | Stock | | | |
|---|---|---|---|---|
|  | A | B | C | D |
| Smoked sheets | 100 | 100 | 100 | 100 |
| Zinc oxide | 5 | 5 | 5 | 5 |
| Finely divided whiting | 25 | 25 | 25 | 25 |
| Stearic acid | 1.5 | 1.5 | 1.5 | 1.5 |
| Sulfur | 2 | 2 | 2 | 2 |
| 2-mercaptobenzothiazole | 0.75 | ---- | 0.75 | ---- |
| 2-mercapto-thiazoline | ---- | 0.75 | ---- | 0.75 |
| Di-ortho-tolyl guanidine | 0.15 | 0.15 | ---- | ---- |
| Butyraldehyde-aniline | ---- | ---- | 0.1 | 0.1 |

Stocks A and C, in which 2-mercaptobenzothiazole is used as the primary accelerator, were run for purposes of comparison with corresponding stocks B and D in which 2-mercaptothiazoline is used as the primary accelerator. The results of the vulcanization tests on these stocks are given in Table I.

*Table I*

| Minutes cured | Temp. | Stock A | | Stock B | | Stock C | | Stock D | |
|---|---|---|---|---|---|---|---|---|---|
|  |  | 500% | Tensile | 500% | Tensile | 500% | Tensile | 500% | Tensile |
| 60 | 227 | 1,375 | 4,300 | 350 | 1,275 | 1,425 | 4,925 | 375 | 1,550 |
| 45 | 287 | 1,175 | 3,500 | 1,050 | 4,000 | 1,075 | 3,775 | 1,150 | 3,475 |
| 60 | 287 | 1,025 | 3,025 | 975 | 3,575 | 1,025 | 3,300 | 1,000 | 3,450 |

These results show (stocks A and B) that, when di-orthotolyl guanidine is used as the secondary accelerator, the stock (stock B), in which 2-mercapto-thiazoline is used as the primary accelerator, is very much safer than the one (stock A), in which 2-mercaptobenzothiazole is used as the primary accelerator. It shows, in the 60 minutes cure at 227° F., a modulus at 500% of only 350 lbs./sq. in. compared with 1375 lbs./sq. in. for stock A, while its tensile strength is only 1275 lbs./sq. in. compared with 4300 lbs./sq. in. for stock A. On the other hand, in the cures at 287° F., the two stocks are substantially equal.

Essentially the same type of results are shown in the case where the butyraldehyde-aniline condensation product, sold under the trade name of "Accelerator 808", is used as the activating accelerator (stocks C and D).

These tests show that it is possible to obtain vulcanizates having very desirable properties through the use of combinations of 2-mercapto-thiazoline and secondary accelerators. Such vulcanizates may be processed with safety as is shown by the tests in which they were cured at 227° F. The extreme safety of these combinations permits a wide latitude in the selection of the accelerator combinations and the amounts of both the primary and secondary accelerators used in the combinations.

In order to show that the results obtained above are not limited to the particular test formula used, the following stocks were prepared.

|  | Stock | |
|---|---|---|
|  | E | G |
| Smoked sheets | 100 | 100 |
| Zinc oxide | 5 | 5 |
| Channel black | 25 | 25 |
| Stearic acid | 3 | 3 |
| Sulfur | 3 | 3 |
| 2-mercapto-thiazoline | 0.9 | 0.9 |
| Di-ortho-tolyl guanidine | 0.1 | ---- |
| Butyraldehyde-aniline | ---- | 0.1 |

These stocks were cured for 30, 45, 60, and 90 minutes at 274° F. and the following test data were obtained.

*Table II*

| Minutes cured at 274° F. | Stock E | | Stock G | |
|---|---|---|---|---|
|  | 500% | Tensile | 500% | Tensile |
| 30 | 2,300 | 4,700 | 2,375 | 4,775 |
| 45 | 2,700 | 5,125 | 2,775 | 5,175 |
| 60 | 3,075 | 4,925 | 3,025 | 4,500 |
| 90 | 3,275 | 4,375 | 3,275 | 4,575 |

There was no difficulty in processing any of these stocks, but, as is shown in the table, when they were cured at 274° F., stocks having very high moduli and tensile strength were obtained.

When accelerating with a combination of accelerators, it is generally customary to use one, the primary accelerator, in much larger amounts than the other, the secondary accelerator or accelerator activator. Under these conditions, the properties of the vulcanizate more nearly approach the properties of a vulcanizate prepared from the primary accelerator alone than they do the properties of a vulcanizate prepared from the secondary accelerator alone. For example, vulcanizates prepared from the guanidines alone are well-known to be very susceptible to rapid deterioration on ageing, i. e. they are poor "ageing" stocks. On the other hand, vulcanizates prepared from the thiazoles or thiazole derivatives are well-known to be extremely resistant to deterioration on ageing. When a small amount of a guanidine is used to activate the cure of a thiazole accelerator, the resulting vulcanizate has the age resisting characteristics of the primary thiazole accelerator. It has been found that vulcanizates, prepared by the combined use of a 2-mercapto-thiazoline and a secondary accelerator, such as the guanidines and the aldehyde-amines, in which the thiazoline is used in a preponderant amount, likewise show characteristics which make them valuable commercial vulcanizates.

Stocks, obtained by this invention, have very good resistance to deterioration, particularly to deterioration on exposure to high temperatures. In order to show this effect, the following stocks were prepared. For purposes of comparison, tests were also made on an activated mercapto-benzothiazole derivative. For this comparison, the zinc salt of mercaptobenzothiazole was used instead of the free mercaptobenzothiazole, since it represents a combination of accelerators which can be handled commercially as contrasted with the activated free mercaptobenzothiazole which is very "scorchy."

|  | Stock | |
| --- | --- | --- |
|  | H | I |
| Smoked sheets | 100 | 100 |
| Zinc oxide | 5 | 5 |
| Channel carbon black | 50 | 50 |
| Stearic acid | 2 | 2 |
| Pine tar | 1.5 | 1.5 |
| Phenyl-beta-naphthylamine | .6 | .6 |
| "Thermoflex" A* | 1.4 | 1.4 |
| Sulfur | 3 | 3 |
| Zinc salt of 2-mercaptobenzothiazole | 0.5 | |
| 2-mercapto-thiazoline | | 0.5 |
| "Accellerator 808"** | 0.15 | 0.15 |

* "Thermoflex" A is the trade name of an antioxidant consisting of 50 parts phenyl-beta-naphthylamine, 25 parts diphenyl-para-phenylene diamine and 75 parts of 4,4′-dimethoxy-diphenyl-amine.
** "Accelerator 808" is the trade name of a butyr-aldehyde-aniline condensation product.

Stocks H and I were cured for 60 minutes at 267° F. and showed the following tensile properties.

*Table III*

| Minutes cured at 267° F. | Stock H | | Stock I | |
| --- | --- | --- | --- | --- |
|  | 500% | Tensile | 500% | Tensile |
| 60 | 2,900 | 4,375 | 3,000 | 4,675 |

These stocks were subjected to artificial ageing by suspending in an air oven at 100° C. for two days. After this time, stock H had a tensile strength of 1925 lbs./sq. in. and an elongation at break of 420% while stock I had a tensile strength of 2400 lbs./sq. in. and an elongation at break of 440%. Another type of ageing test was run by suspending these stocks in an oxygen bomb at 300 pounds oxygen pressure and at 70° C. After 14 days, stock H had a tensile strength of 1375 lbs./sq. in. and an elongation at break of 420%, while stock I had a tensile strength of 1800 lbs./sq. in. and an elongation at break of 460%. These tests show the extremely great resistance to deterioration exhibited by stocks cured with a combination of 2-mercapto-thiazoline and a secondary accelerator.

Although certain definite combinations of activating accelerators with 2-mercapto-thiazoline have been shown, these combinations are illustrative rather than limiting. It is also possible to use other guanidines, for example, diphenyl guanidine or triphenyl guanidine or the derivatives of the guanidines such as diphenyl guanidine phthalate or tartrate or the zinc chloride addition products of the guanidines. Other aldehyde-amines, for example, butyraldehyde-butylamine, anhydro formaldehyde-paratoluidine, anhydro formaldehyde-aniline or methylene dianilide may be used.

It is, of course, obvious that compounding ingredients and fillers, other than those shown in the test formulae and in other proportions, may also be used.

While the tests have shown only the use of 2-mercapto-thiazoline itself as the primary accelerator, equally good results can be obtained with the use of the carbon substituted 2-mercapto-thiazolines in which one or both of the hydrogen atoms in the 4 or 5 or both the 4 and 5 positions of the thiazoline ring are substituted by alkyl groups or hydroxy alkyl groups; such as, for example 4-methyl-2-mercapto-thiazoline
4-ethyl-2-mercapto-thiazoline
4-propyl-2-mercapto-thiazoline
4,4-dimethyl-2-mercapto-thiazoline
5,5-dimethyl-2-mercapto-thiazoline
4-methyl-4-ethyl-2-mercapto-thiazoline
4-methyl-5-propyl-2-mercapto-thiazoline
4,4-dimethyl-5-propyl-2-mercapto-thiazoline
4-isopropyl-5-propyl-2-mercapto-thiazoline
4,4-dimethyl-5-propyl-2-mercapto-thiazoline
4-ethyl-5-propyl-2-mercapto-thiazoline
4-methyl-4-hydroxymethyl-2-mercapto-thiazoline
4-methyl-4-ethyl-5-propyl-2-mercapto-thiazoline
4-ethyl-5-methyl-2-mercapto-thiazoline
4-propyl-5-propyl-2-mercapto-thiazoline While we have disclosed the preferred embodiments of our invention and the preferred modes of carrying the same into effect, it will be readily apparent to those skilled in the art that many variations and modifications may be made therein, particularly in the combinations of accelerators and in the other ingredients of the rubber mix without departing from the scope of our invention. Accordingly, the scope of our invention is not to be limited to the specific accelerators and combination of accelerators, particularly named, or to the other ingredients or conditions particularly disclosed, but we intend to claim the invention broadly as in the appended claims.

We claim:

1. Rubber having incorporated therein a small proportion of a combination of primary and secondary accelerators in which the primary accelerator is a member of the group consisting of 2-mercapto-thiazoline and carbon substituted 2-mercapto-thiazolines in which the substituents are selected from alkyl and hydroxyalkyl groups, and the secondary accelerator is a member of the group consisting of aldehyde-amines and aryl guanidines, there being from about 1 to about 50 parts of the primary accelerator to each part of the secondary accelerator in the combination.

2. Rubber having incorporated therein a small proportion of a combination of primary and secondary accelerators in which the primary accelerator is a member of the group consisting of 2-mercapto-thiazoline and carbon substituted 2-mercapto-thiazolines in which the substituents are selected from alkyl and hydroxyalkyl groups, and the secondary accelerator is an aldehyde-amine, there being from about 1 to about 50 parts of the primary accelerator to each part of the secondary accelerator in the combination.

3. Rubber having incorporated therein a small proportion of a combination of primary and secondary accelerators in which the primary accelerator is a member of the group consisting of 2-mercapto-thiazoline and carbon substituted 2-mercapto-thiazolines in which the substituents are selected from alkyl and hydroxyalkyl groups, and the secondary accelerator is butyraldehyde-aniline, there being from about 1 to about 50 parts of the primary accelerator to each part of the secondary accelerator in the combination.

4. Rubber having incorporated therein a small proportion of a combination of primary and secondary accelerators in which the primary accelerator is 2-mercapto-thiazoline, and the secondary accelerator is an aldehyde-amine, there being from about 1 to about 50 parts of the primary accelerator to each part of the secondary accelerator in the combination.

5. Rubber having incorporated therein a small proportion of a combination of primary and secondary accelerators in which the primary accelerator is 2-mercapto-thiazoline, and the secondary accelerator is butyraldehyde-aniline, there being from about 1 to about 50 parts of the primary accelerator to each part of the secondary accelerator in the combination.

6. Rubber having incorporated therein a small proportion of a combination of primary and secondary accelerators in which the primary accelerator is a substituted 2-mercapto-thiazoline, in which each substituent is an alkyl group bonded to a ring carbon atom of the thiazoline ring, and the secondary accelerator is an aldehyde-amine, there being from about 1 to about 50 parts of the primary accelerator to each part of the secondary accelerator in the combination.

7. Rubber having incorporated therein a small proportion of a combination of primary and secondary accelerators in which the primary accelerator is a substituted 2-mercapto-thiazoline in which each substituent is a lower alkyl group bonded to a ring carbon atom of the thiazoline ring, and the secondary accelerator is an aldehyde-amine, there being from about 1 to about 50 parts of the primary accelerator to each part of the secondary accelerator in the combination.

8. Rubber having incorporated therein a small proportion of a combination of primary and secondary accelerators in which the primary accelerator is a substituted 2-mercapto-thiazoline in which each substituent is a lower alkyl group bonded to a ring carbon atom of the thiazoline ring, and the secondary accelerator is butyraldehyde-aniline, there being from about 1 to about 50 parts of the primary accelerator to each part of the secondary accelerator in the combination.

9. Rubber having incorporated therein a small proportion of a combination of primary and secondary accelerators in which the primary accelerator is 4-methyl-2-mercapto-thiazoline, and the secondary accelerator is an aldehyde-amine, there being from about 1 to about 50 parts of the primary accelerator to each part of the secondary accelerator in the combination.

10. The method of vulcanizing rubber which comprises incorporating in a rubber mix, prior to vulcanization, a small proportion of a combination of primary and secondary accelerators in which the primary accelerator is a member of the group consisting of 2-mercapto-thiazoline and carbon substituted 2-mercapto-thiazolines in which the substituents are selected from alkyl and hydroxyalkyl groups, and the secondary accelerator is a member of the group consisting of aldehyde-amines and aryl guanidines, there being from about 1 to about 50 parts of the primary accelerator to each part of the secondary accelerator in the combination.

11. The method of vulcanizing rubber which comprises incorporating in a rubber mix, prior to vulcanization, a small proportion of a combination of primary and secondary accelerators in which the primary accelerator is 2-mercapto-thiazoline, and the secondary accelerator is butyraldehyde-aniline, there being from about 1 to about 50 parts of the primary accelerator to each part of the secondary accelerator in the combination.

12. The method of vulcanizing rubber which comprises incorporating in a rubber mix, prior to vulcanization, a small proportion of a combination of primary and secondary accelerators in which the primary accelerator is 4-methyl-2-mercapto-thiazoline, and the secondary accelerator is an aldehyde-amine, there being from about 1 to about 50 parts of the primary accelerator to each part of the secondary accelerator in the combination.

13. Rubber having incorporated therein a small proportion of a combination of primary and secondary accelerators in which the primary accelerator is a member of the group consisting of 2-mercapto-thiazoline and carbon substituted 2-mercapto-thiazolines in which the substituents are selected from alkyl and hydroxyalkyl groups, and the secondary accelerator is an aryl guanidine, there being from about 1 to about 50 parts of the primary accelerator to each part of the secondary accelerator in the combination.

14. Rubber having incorporated therein a small proportion of a combination of primary and secondary accelerators in which the primary accelerator is a member of the group consisting of 2-mercapto-thiazoline and carbon substituted 2-mercapto-thiazolines in which the substituents are selected from alkyl and hydroxyalkyl groups, and the secondary accelerator is a diaryl guanidine, there being from about 1 to about 50 parts of the primary accelerator to each part of the secondary accelerator in the combination.

15. Rubber having incorporated therein a small proportion of a combination of primary and secondary accelerators in which the primary accelerator is 2-mercapto-thiazoline, and the secondary accelerator is an aryl guanidine, there being from about 1 to about 50 parts of the primary accelerator to each part of the secondary accelerator in the combination.

16. Rubber having incorporated therein a small proportion of a combination of primary and secondary accelerators in which the primary accelerator is 2-mercapto-thiazoline, and the secondary accelerator is a diaryl guanidine, there being from about 1 to about 50 parts of the primary accelerator to each part of the secondary accelerator in the combination.

17. Rubber having incorporated therein a small proportion of a combination of primary and secondary accelerators in which the primary accelerator is 2-mercapto-thiazoline, and the secondary accelerator is di-ortho-tolyl guanidine, there being from about 1 to about 50 parts of the primary accelerator to each part of the secondary accelerator in the combination.

ARTHUR M. NEAL.
BERNARD M. STURGIS.